US012778733B2

(12) United States Patent
Hallman et al.

(10) Patent No.: US 12,778,733 B2
(45) Date of Patent: Nov. 3, 2026

(54) DOME INHALER SYSTEM AND METHOD

(71) Applicants: Edward David Hallman, Portland, OR (US); Justin Jon Coope, Portland, OR (US)

(72) Inventors: Edward David Hallman, Portland, OR (US); Justin Jon Coope, Portland, OR (US)

( * ) Notice: Subject to any disclaimer, the term of this patent is extended or adjusted under 35 U.S.C. 154(b) by 778 days.

(21) Appl. No.: 17/881,699

(22) Filed: Aug. 5, 2022

(65) Prior Publication Data

US 2023/0045145 A1 Feb. 9, 2023

Related U.S. Application Data

(60) Provisional application No. 63/229,700, filed on Aug. 5, 2021.

(51) Int. Cl.
*A61D 7/04* (2006.01)

(52) U.S. Cl.
CPC .................................... *A61D 7/04* (2013.01)

(58) Field of Classification Search
CPC ........ A61D 7/00–04; A61M 11/00–08; A61M 13/00–006; A61M 15/00–085
See application file for complete search history.

(56) References Cited

U.S. PATENT DOCUMENTS 3,552,391 A * 1/1971 Deaton .................. A61G 10/04 128/205.26
4,407,280 A 10/1983 Trammell et al.
4,577,628 A * 3/1986 Hickmann ............... A61D 7/04 128/200.14
5,954,049 A * 9/1999 Foley ....................... A61D 7/04 128/203.29
6,588,022 B1 * 7/2003 Anders .................... A42B 3/30 2/424
8,833,311 B2 9/2014 Kostelec
(Continued)

FOREIGN PATENT DOCUMENTS

WO WO-2008111255 A1 * 9/2008 ........... A61M 11/06

OTHER PUBLICATIONS

"Dog or Cat Oxygen Therapy Rescue Mask," amazon.com. https://www.amazon.com/Oxygen-Therapy-Rescue-Mask-Medium/dp/B07JDSGPPW [Date accessed: Apr. 8, 2021].

*Primary Examiner* — Rachel T Sippel
*Assistant Examiner* — Jacqueline M Pinderski
(74) *Attorney, Agent, or Firm* — Bold IP PLLC; Houda El-Jarrah

(57) ABSTRACT

A dome inhaler system is provided. The dome inhaler system includes a transparent dome with an opening designed to be placed over a pet's head to facilitate the pet's breathing of medicine dispensed within the dome. The system also includes an inhaler flange designed to mate an inhaler with the dome's opening to dispense a dose of medicine (preferably aerosolized) into the dome. Once the medicine is dispensed into the dome, the inhaler flange may be removed, and the dome may be placed over the head of a pet for the pet to freely breathe in the medicine. The system also allows for the metered or continuous introduction of therapeutic gasses and other concentrated atmospheres to the subject while the subject's head is within the dome. The dome may then be easily removed by lifting it off of the pet's head.

15 Claims, 8 Drawing Sheets

(56) References Cited

U.S. PATENT DOCUMENTS

| | | | | | |
|---|---|---|---|---|---|
| 2003/0075174 | A1 | 4/2003 | Shahaf | | |
| 2004/0250816 | A1 * | 12/2004 | Kummer | A61M 16/06 | 128/200.23 |
| 2007/0272169 | A1 * | 11/2007 | Barney | A61D 7/04 | 128/203.29 |
| 2007/0283954 | A1 * | 12/2007 | Dhuper | A61M 15/0086 | 128/203.15 |
| 2008/0110463 | A1 * | 5/2008 | Hajgato | A61M 16/0616 | 128/205.25 |
| 2011/0214671 | A1 * | 9/2011 | London | A61M 15/0016 | 128/203.12 |
| 2012/0203125 | A1 * | 8/2012 | Moran | A61D 7/04 | 128/203.29 |
| 2014/0251319 | A1 * | 9/2014 | Hoke-Kearns | A62B 9/003 | 128/200.14 |
| 2016/0107006 | A1 * | 4/2016 | Giulianotti | A61M 16/0627 | 128/201.28 |
| 2022/0347421 | A1 * | 11/2022 | Goldman | A61M 16/06 | |

* cited by examiner

DOME INHALER SYSTEM AND METHOD

CROSS-REFERENCE TO RELATED APPLICATIONS

This application claims priority to U.S. Provisional Application No. 63/229,700 filed Aug. 5, 2021, the entire contents of which are hereby fully incorporated herein by reference for all purposes.

FIELD OF THE INVENTION

This invention relates to enriched atmosphere devices, including an enriched atmosphere dome inhaler.

BACKGROUND

Inhalers, such as metered-dose inhalers (MDI)), are used throughout the world to treat people with asthma, chronic obstructive pulmonary disease (COPD), and other conditions where it is preferable to introduce treatment directly into the subject's respiratory system. In use, the output end of the inhaler is inserted into the mouth of the patient and the inhaler is triggered to discharge a dose of aerosolized medicine for the patient to breathe in. Because the use of such inhalers is well understood, such use is not widely known to cause anxiety for the patients.

In addition, pets (e.g., cats, dogs, etc.) also that suffer from asthma or other conditions may be treated with such inhalers. Common ways of using an inhaler with an animal include configuring the inhaler with a mask that must be held over the animal's mouth. Because the animal may not understand what is happening to him/her during this procedure, the procedure oftentimes causes anxiety for the pet thereby making the procedure difficult and traumatizing (for both the pet and the owner of the pet).

Accordingly, there is a need for a dome inhaler system to treat animals with lung-related conditions while minimizing any anxiety that such treatments may cause. The presently disclosed system addresses these needs.

SUMMARY

According to one aspect, one or more embodiments are provided below for an inhaler system including a dome including a dome inner volume and a dome opening passing from outside the dome to the dome inner volume, a flange including a flange input port, a flange output port and a flange inner volume extending between the flange input port and the flange output port, the flange output port including a flange output port cavity, wherein the flange input port is adapted to receive an output end of an inhaler device, and wherein the flange output port cavity is adapted to releasably receive the dome opening and a portion of the dome surrounding the dome opening.

In another embodiment, the inhaler system also includes at least one breathing hole located in the dome and adapted to allow air to pass from outside the dome inner volume to inside the dome inner volume.

In another embodiment, the dome includes a height between the dome opening and a side of the dome opposite the dome opening, and the at least one breathing hole is located between a midpoint of the height and the dome opening.

In another embodiment, when the flange input port receives an output end of the inhaler device and the flange output cavity releasably receives the dome opening and a portion of the dome surrounding the dome opening, the output end of the inhaler device is in fluid communication with the dome inner volume.

In another embodiment, the dome is transparent or opaque.

In another embodiment, the portion of the dome surrounding the dome opening includes an outer surface curvature, and the flange output port cavity includes an inner surface curvature that corresponds to the outer surface curvature.

In another embodiment, the flange output port cavity is formed as a portion of a hemispherical dome.

In another embodiment, the flange input port is located at an apex of the flange output port cavity.

In another embodiment, a shape of the flange output port corresponds to a shape of the dome opening.

In another embodiment, a diameter of the flange output port is greater than a diameter of the dome opening.

In another embodiment, a size of the flange input port corresponds to a size of the output end of the inhaler device.

In another embodiment, a shape of the flange input port corresponds to a shape of the output end of the inhaler device.

In another embodiment, a diameter of the dome is about 5"-8".

In another embodiment, a diameter of the dome opening is about 3"-6".

In another embodiment, a diameter of the at least one breathing hole is about 1/16"-5/16".

In another embodiment, the dome includes a dome handle.

In another embodiment, the inhaler system also includes a safety strap with a first end connected to the dome handle.

In another embodiment, the flange input port is pliable.

In another embodiment, the inhaler system also includes a gas tube receiving nipple configured with the dome.

In another embodiment, the dome includes at least one reinforcement rib extending between the dome opening to a side of the dome opposite the dome opening.

Other aspects and advantages of the invention will be apparent from the following description and the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF EXEMPLARY EMBODIMENTS

In general, and according to exemplary embodiments hereof, a dome inhaler system is provided. As described herein, the dome inhaler system 10 includes a transparent dome with an opening designed to be placed over a pet's head to facilitate the pet's breathing of medicine dispensed within the dome. Such a dome may be referred to as an enriched atmosphere dome. The system 10 also includes an inhaler flange designed to mate an inhaler with the dome's opening to dispense a dose of medicine (preferably aerosolized) into the dome. Once the medicine is dispensed into the dome, the inhaler flange may be removed, and the dome may be placed over the head of a pet for the pet to freely breathe in the medicine. The dome may then be easily removed by lifting it off of the pet's head.

For the purposes of this specification, the inhaler system 10 will be described predominantly with respect to its use with pets (e.g., cats, dogs, etc.). However, it is understood that the system 10 may be used with other types of animals (e.g., livestock, zoo animals, etc.) as well as with humans, and that the scope of the system 10 is not limited in any way by the type of animal or person that it may be used with.

Figure 1:
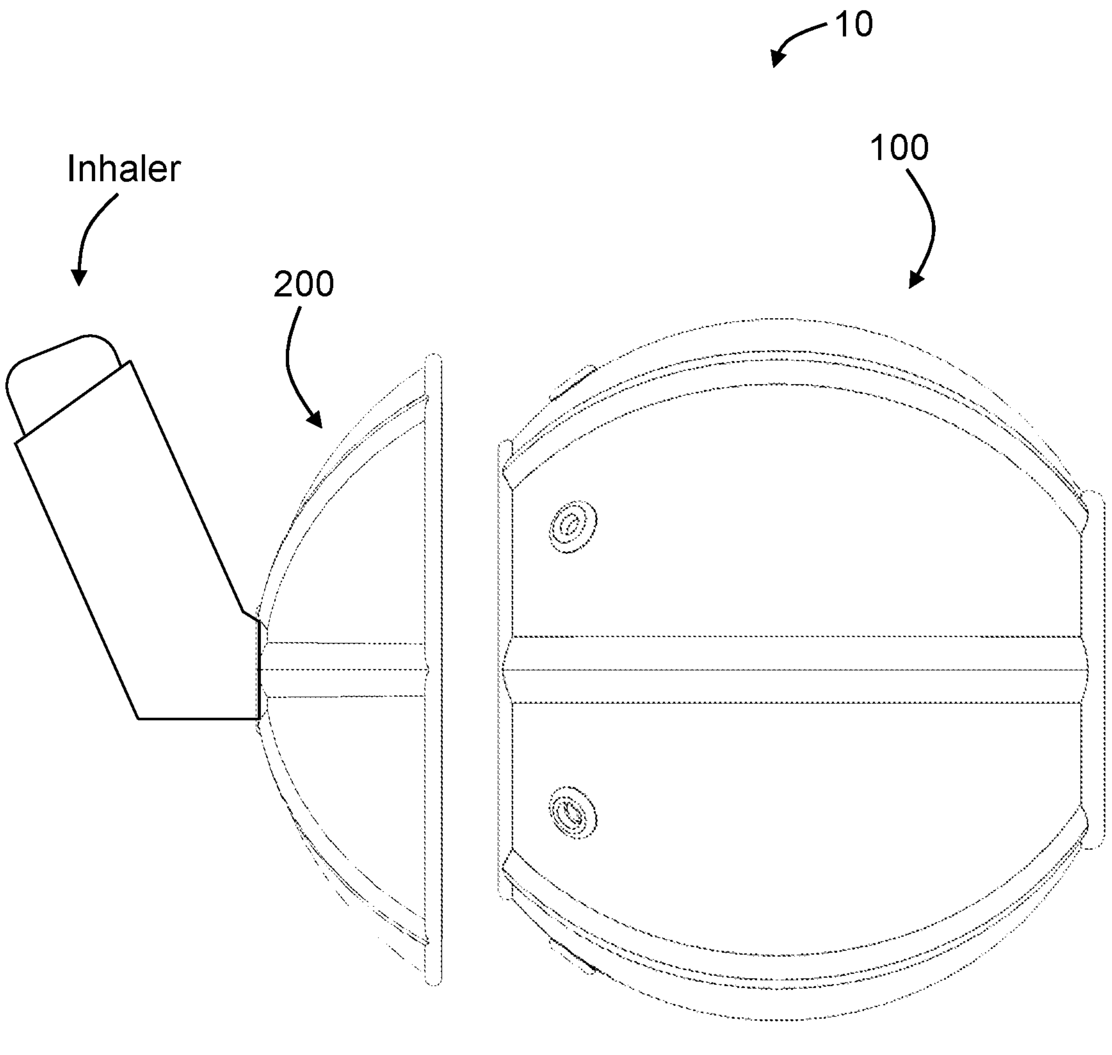
FIG. 1 shows aspects of a dome inhaler system according to exemplary embodiments hereof.
Figure 2:
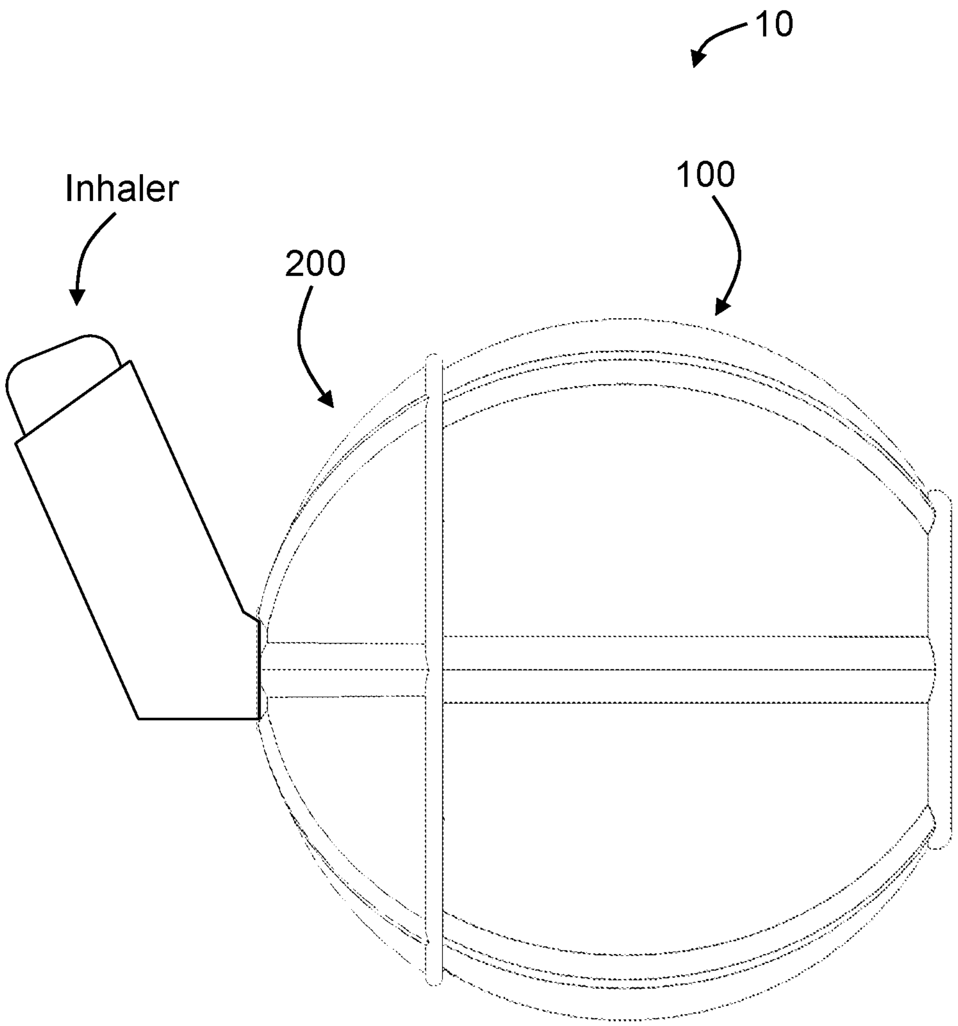
FIG. 2 shows aspects of a dome inhaler system according to exemplary embodiments hereof.

In some embodiments as shown in FIGS. 1-2, the dome inhaler system 10 includes a dome assembly 100 and an inhaler flange 200. FIG. 1 shows the dome assembly 100 and the inhaler flange 200 separated and FIG. 2 shows the dome assembly 100 and the inhaler flange 200 abutted.

In general, the input of the inhaler flange 200 is first coupled with an inhaler device (e.g., a metered-dose inhaler (MDI)) and the output of the flange 200 is abutted over the opening of the dome assembly's 100's input. In this way, the output of the inhaler device is in fluid communication with the inner volume of the dome assembly 100. Next, the inhaler device may be triggered to dispense a dose of aerosolized medicine into the dome assembly 100. The inhaler flange 200 may then be removed and the dome assembly 100 may be placed over the head of a pet so that the pet may breathe in the medicine. After the treatment, the dome assembly 100 is easily removed. The dome inhaler system 10 also may include other elements and/or components as necessary to perform its functionalities.

Dome Assembly 100

Figure 3:
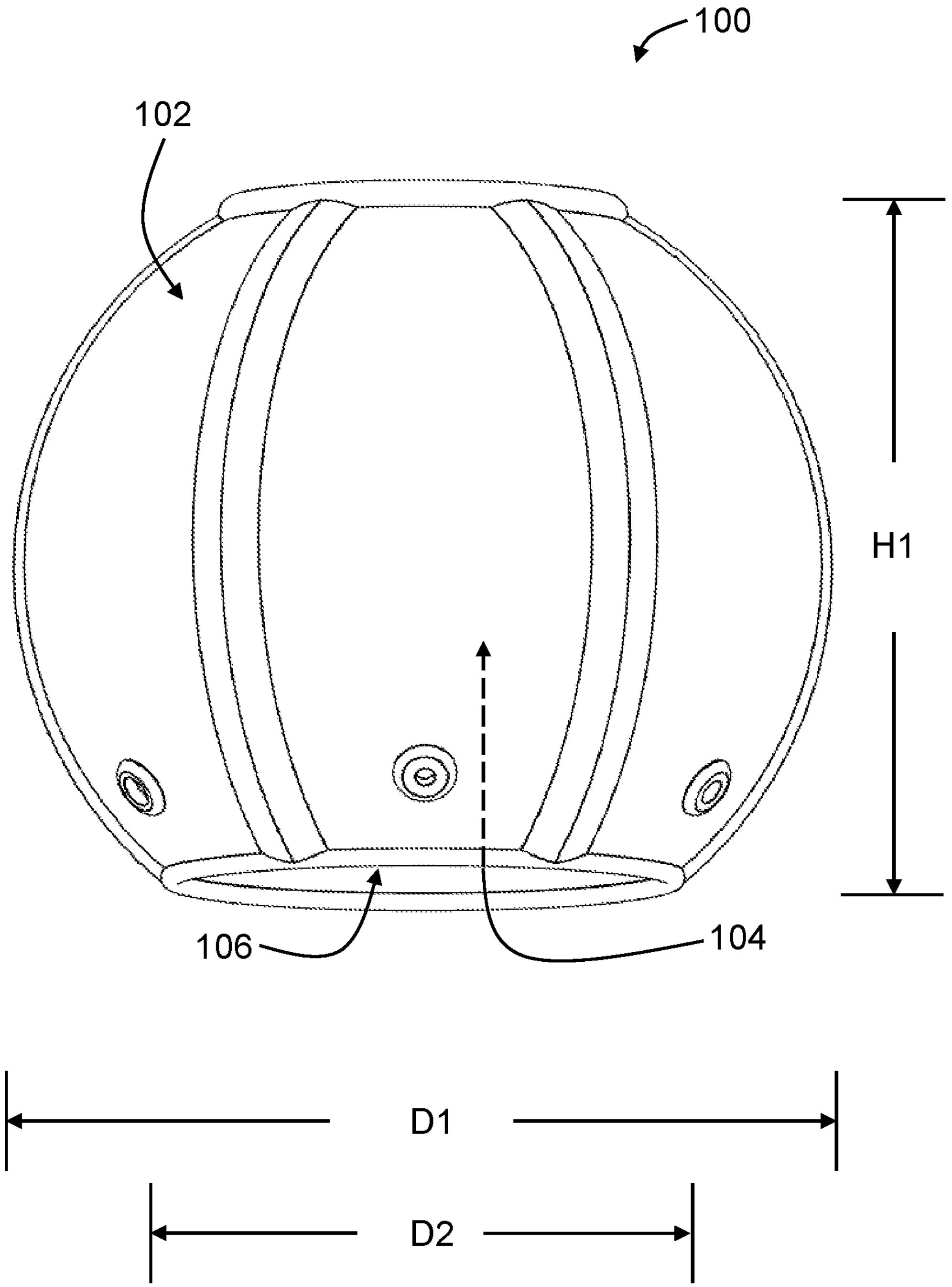
FIG. 3 shows aspects of a dome body according to exemplary embodiments hereof.

In some embodiments as shown in FIG. 3, the dome assembly 100 includes a dome body 102 with an inner volume 104, and an opening 106 extending from outside the dome body 102 to the inner volume 104. The opening 106 is preferably circular with a diameter D1 as shown in FIG. 3, but other shapes (such as an oval shape) also may be used. In a preferred embodiment, the opening 106 is positioned at the bottom (or base) of the dome body 102 as shown. The opening 106 provides an input into the inner volume 104 through which to dispense an aerosolized medication. The opening 106 also serves as the aperture that a pet's head may pass through when the dome assembly 100 is placed over the head of the animal.

In some embodiments, as shown in FIG. 3, the dome body 102 is generally spherical in shape. However, in other embodiments, the dome body 102 may be formed as an ellipsoid with a height H1 that is greater than its diameter D1. In use, the dome body 102 is designed to fit over a pet's head while resting on its shoulders.

In some embodiments, as shown in FIG. 3, the dome body's 102's diameter D1 is chosen to adequately encircle the pet's head, whereby diameter D1 may be wider than D2 to provide enough room for a pet's head inside of the dome body 102. For example, in some embodiments, the dome diameter D1 may be about 2 inches to about 36 inches, and preferably about 4 inches to 14 inches, and more preferably about 5 inches to 8 inches, and more preferably about 6.5 inches. It is understood that the diameter D1 of the dome body 102 may be chosen to generally correspond to the size of the animal's head for which it will be used.

In some embodiments, as shown in FIG. 3, the diameter D2 of the dome opening 106 is about 2 inches to 24 inches, and preferably about 3 inches to 6 inches, and more preferably about 4.5 inches. It is understood that the diameter D2 of the dome opening 106 may be chosen to generally correspond to the size of the animal's head for which it will be used.

In a preferred embodiment as shown in FIG. 3, the dome body 102 is formed using a degenerate tessellation of k biangles (where k is any integer>1). As is known in the art, a biangle is a two-sided polygon that is strictly contained in one hemisphere of a sphere that is serving as a model for spherical geometry. This may result in a "beach ball" type of spherical structure. In other embodiments, however, it also is contemplated that the dome body 102 may be formed using regular spherical tessellations, e.g., using (i) three triangles each with 120° angles meeting at each vertex, (ii) four triangles each with 90° angles meeting at each vertex, (iii) five triangles each with 72° angles meeting at each vertex, (iv) three quadrilaterals each with 120° angles meeting at each vertex, (v) three pentagons each with 120° angles meeting at each vertex, and/or other types of spherical tessellations. It is understood that these examples are meant for demonstration and that the dome body 102 may be formed using any type of periodic and/or non-periodic tessellations or tiling.

Figure 4:
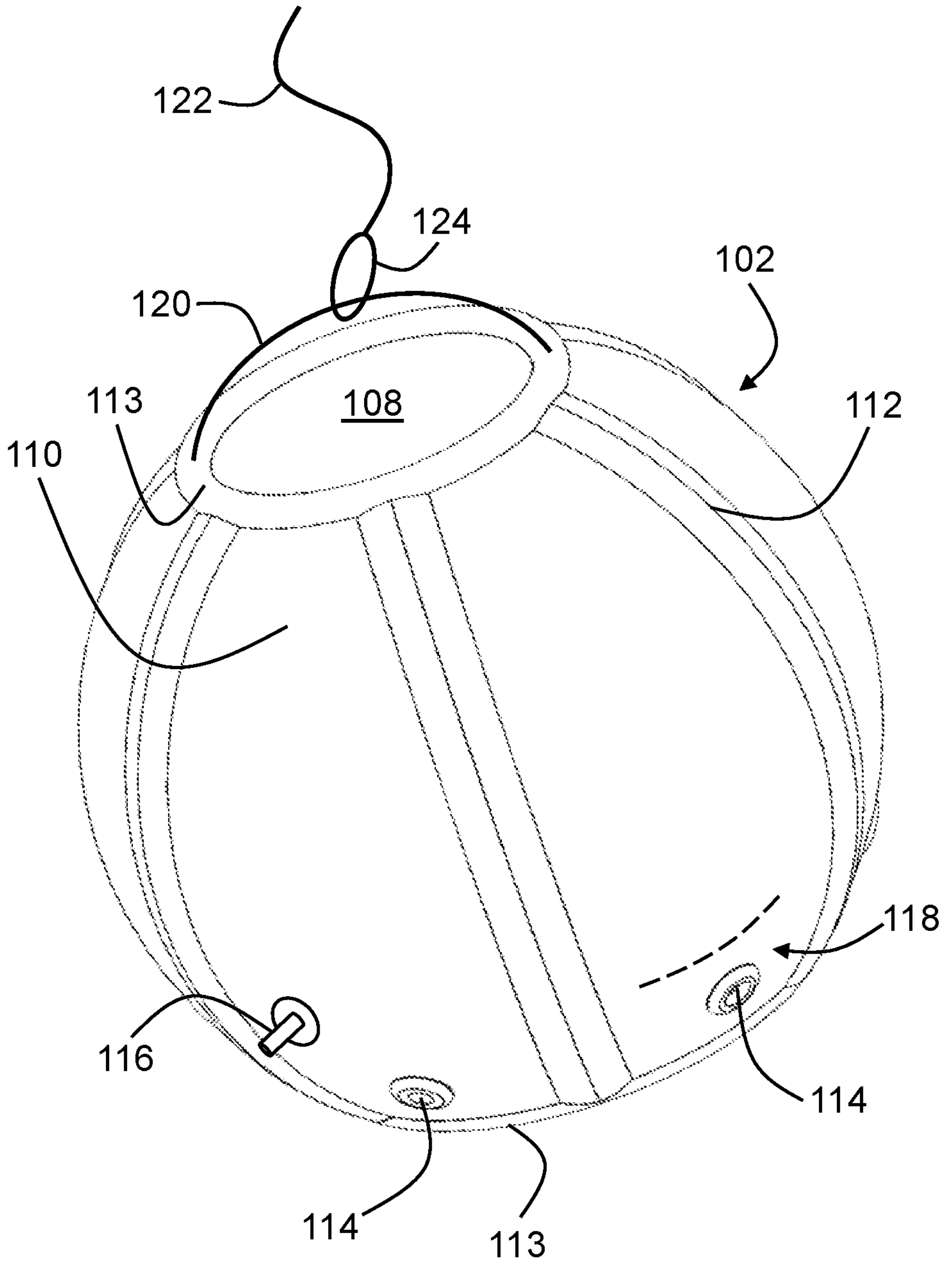
FIG. 4 shows aspects of a dome body according to exemplary embodiments hereof.

In some embodiments, as shown in FIG. 4, the dome body 102 is formed as a tessellation including a top section 108 and side panels 110. In some embodiments, the top section 108 is generally circular (with a diameter of about 3 inches), however it is contemplated that the top section 108 may be formed as a polygon such as, e.g., a hexagon (six sided) or other types of polygons. The side panels 110 may each extend from top-to-bottom from the outer perimeter of the top section 108 to the outer perimeter of the opening 106. In the example depicted in FIG. 4, the dome body 102 includes six side panels 110. However, it is understood that the dome body 102 may include any number of side panels 110 and that the scope of the dome assembly 100 is not limited in any way by the number of side panels 110 that it may include.

In some embodiments as shown in FIG. 4, the top section 108, and the side panels 110 may be produced separately and joined using adhesive, bonding materials, stitching, plastic welding, other bonding techniques, and any combinations thereof. It may be preferable that the junctions between the top section 108 and the side panels 110, and between each of the side panels 110 themselves be reinforced to provide additional structure and rigidity to the dome body 102.

In some embodiments, as shown in FIG. 4, the dome body 102 may include reinforcement ribs 112 that generally extend from its top section 108 to its lower opening 106. In some embodiments, the opening 106 and/or the top section 108 may each include a reinforcement ring 113 about its perimeter.

In other embodiments, the dome body 102 may be formed as a single piece (e.g., blow molded, injection molded), and the reinforcement ribs 112 and/or rings 113 may be included within the molding process and/or added thereafter (e.g., attached to the outside surface and/or inside surface, configured as an exoskeleton, etc.). In other embodiments, the reinforcement ribs 112 and/or rings 113 may be omitted.

It is understood that the dome body 102 may be formed using any suitable techniques and that the scope of the dome body 102 is not limited in any way by the way in which it is formed.

In addition, while the dome body 102 has been described as generally spherical (or ellipsoidal), the dome body 102 may be formed as other shapes such as cuboids, prisms, and other suitable shapes with suitable inner volumes 104.

The dome body 102 is preferably wholly (or at least partially) transparent, translucent, opaque, and/or any combinations thereof. In this way, the pet may experience less anxiety when the dome 102 is placed over its head. The dome body 102 also is preferably flexible (pliable) and deformable. In this way, the dome body 102 may be placed over a pet's head more safely and comfortably. The flexibility also enables the dome body 102 to be folded (or flattened) into a compact form for storage when not in use and unfolded into a generally spherical shape for use with an animal.

In some embodiments, the dome body 102 comprises plastic(s) such as, without limitation, high density polyethylene (HDPE), low density polyethylene (LDPE), linear low density polyethylene (LLDPE), acrylic, nylon, polycarbonate, silicone, flexible resin, custom elastomers, other types of plastics, other types of suitable materials, and any combinations thereof.

In some embodiments as shown in FIG. 4, the dome body 102 includes one or more breathing holes 114 (also referred to as gas exchange holes or ventilation holes) for allowing outside air to enter the dome body 102 as required for the animal to breathe. In some embodiments, the breathing holes 114 may be located periodically about the circumference of the dome 102 generally near or adjacent the opening 106 (e.g., between a midpoint of the height H1 and the opening 106). It may be preferable that the breathing holes 114 allow air to enter into the dome 102 while not facilitating the escape of the aerosolized medicine that may be present within the dome body's 102's inner volume. In addition, it is contemplated that the breathing holes 114 may be positioned in any locations as required.

In some embodiments, the breathing holes 114 may include diameters that generally match the diameters of commonly used gas delivery tubing, e.g., 3/16 inch, 1/4 inch, 5/16 inch and/or other suitable diameter values. In some embodiments, the dome body 102 may include six breathing holes 114, two of each diameter listed above. However, it is understood that the dome body 102 may include any number of breathing holes 114 of any suitable diameters. In some embodiments, each side panel 110 may include one breathing hole 114. Additionally, it may be preferable that the combined aggregate surface area of all of the breathing holes 114 equal or exceed the total cross-sectional area of the animal's trachea so that the breathing holes 114 allow for uninterrupted breathing of the animal at all times.

In some embodiments, the breathing holes 114 are adapted to receive an end of a gas delivery tube to deliver gas from the tube into the inner volume 104. For example, one end of a gas delivery tube may be connected to an oxygen supply tank and the opposite end of the tube may be inserted through a breathing hole 114 to supply oxygen into the inner volume 104 of the dome body 102. Accordingly, it may be preferable that the inner diameter of the breathing hole 114 generally correspond to the outer diameter of the gas delivery tube, e.g., to a 3/16 inch, 1/4 inch, and/or 5/16 inch diameter standard breathing tube (or any other diameter of any other suitable gas tubing). In this way, the system 10 may be used as a metered dose or continuous flow positive pressure gas application device (e.g., to provide treatment to animals with kennel cough or following exposure to smoke or other respiratory irritants).

In some embodiments, as shown in FIG. 4, the dome body 102 includes a gas tube receiving nipple 116 adapted to receive and mate with the end of the gas tube to facilitate the delivery of gas from the gas tube into the inner volume 104 of the dome 102.

In some embodiments, as shown in FIG. 4, the dome body 102 includes a reinforcement layer 118 or layer thickening in the area of the breathing holes 114 and/or the gas tube receiving nipple 116. In this way, the dome 102 may withstand forces applied to the dome 102 during the insertion and/or removal of a gas delivery tube.

In some embodiments as shown in FIG. 4, the dome body 102 includes a handle 120 positioned at its top end or in any other suitable location. The handle 120 may be configured with the top section 108, the side panels 110, and/or with the reinforcement ribs 112. The system 10 also may include a safety strap 122 with a hook or loop 124 on one end (or other type of attachment mechanism) that may be connected to the handle 120. The safety strap 122 may be held by or attached to the user of the system 10 (e.g., by a wrist strap or similar) to facilitate the removal of the dome body 102 from the animal's head should the animal attempt to flee during use. That is, should the animal flee, the dome body 102 (being retained by the user via the strap 122 and the hook 124, and being somewhat pliable) would simply slip from the animal's head.

Inhaler Flange 200

Figure 5:
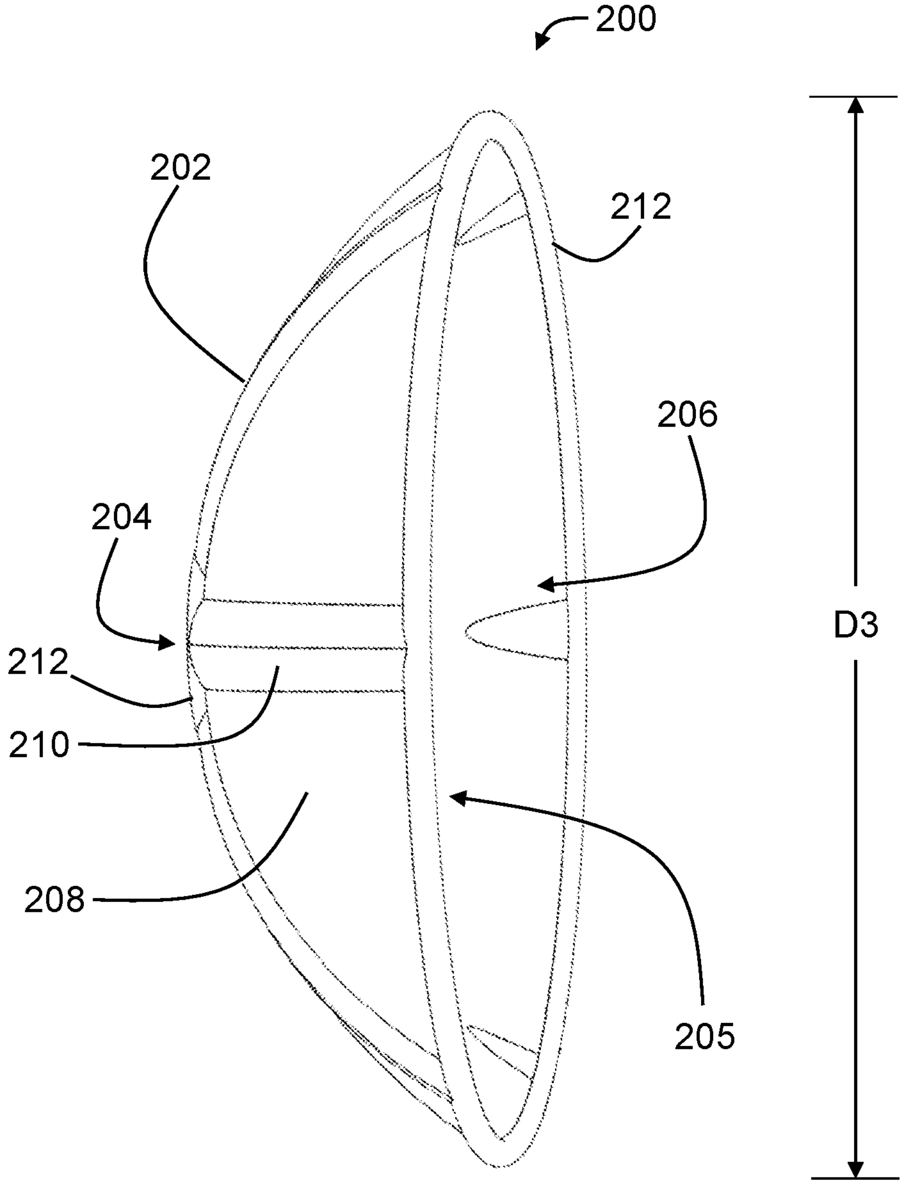
FIG. 5 shows aspects of a flange body according to exemplary embodiments hereof.

In some embodiments as shown in FIG. 5, the inhaler flange 200 includes a flange body 202 including an input port 204 (i.e., an input opening) and an output port 206 (i.e., an output opening). The input port 204 and the output port 206 are in fluid communication through the inner volume 205 of the flange body 202. The input port 204 is designed to receive and releasably secure the output end of an inhaler (e.g., a metered-dose inhaler (MDI)), and the output port 206 is designed to releasably mate (e.g., overlap and/or abut against) with the opening 106 of the dome body 102.

In some embodiments as shown in FIG. 5, the flange body 202 may be shaped generally as a hemispherical dome or a portion thereof, including the input port 204 located at the flange body's 202's apex. The side of the flange body opposite the apex is open thereby exposing the flange body's 202's inner volume 205 (also referred to as the inner cavity) and forming the flange body's 202's output port 206.

The shape of the flange body 202 and its outport port 206 and inner volume 205 is preferably chosen to correspond to the shape of the portion of the dome body 102 immediately surrounding the dome opening 106 as shown for example in FIG. 3. In this way, the output port 206 of the flange body 202 may receive the portion of the dome body 102 and its opening 106 with the dome body 102 fitting flush within the flange body 202 (see FIG. 2). It also is contemplated that the flange body 202 be formed as a cone, frustum, or other suitable shape.

For example, if the dome body opening 106 includes a generally circular shape (see FIG. 3), it is preferable that the flange body output port 206 also include a generally circular shape of similar or larger size. In this way, the flange body output port 206 may be aligned with and abutted against the dome body opening 106 to mate the two elements 106, 206. Expanding on this example, it may be preferable that the diameter D3 of the flange body output port 206 (see FIG. 5) be equal or slightly greater than the diameter D2 of the dome body opening 106 (see FIG. 3) so that the output port 206 may fully encompass the opening 106 when mated. This may help to form a leak-proof seal.

Figure 6:
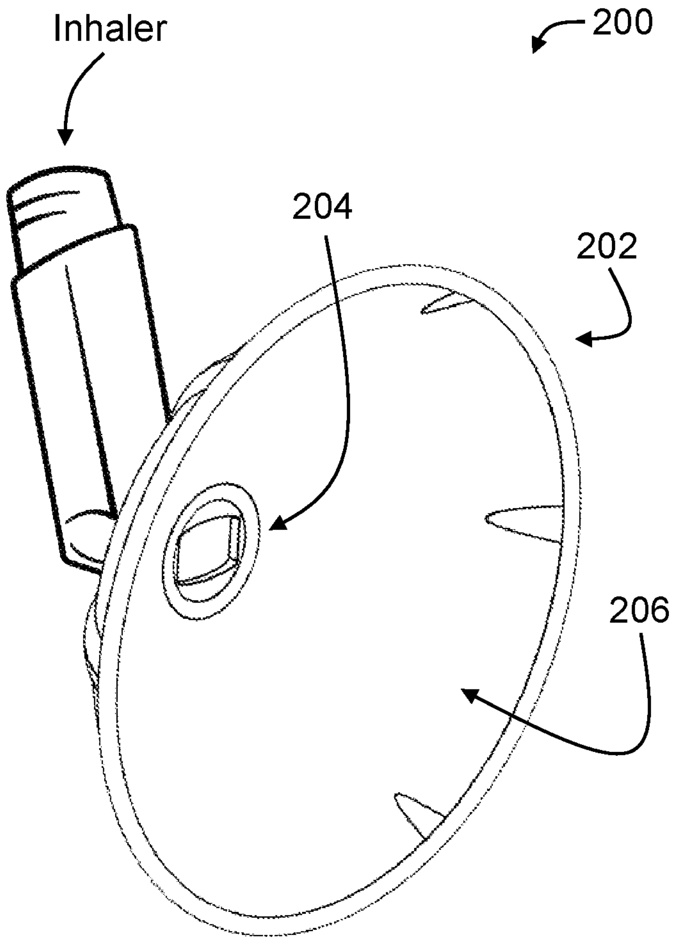
FIG. 6 shows aspects of a flange body configured with an inhaler according to exemplary embodiments hereof.

In some embodiments, as shown in FIG. 6, the input port 204 of the flange body 202 includes an opening with a shape that generally corresponds to the outer circumferential shape of the inhaler's output end. The flange's input port 204 is preferably pliable so that the inhaler's output end may be pressed into the input port 204 and held snug therein.

In some embodiments as shown in FIG. 5, the flange body 202 is formed using tessellations of side panels 208 (tiles). In some embodiments as shown, the side panels 208 may be generally triangular (and/or trapezoidal) in shape, with an apex of each panel 208 positioned adjacent the flange input port 204.

As with the dome body 102 described above, and as shown in FIG. 5, the flange side panels 208 may be produced separately and joined using adhesive, bonding materials, stitching, plastic welding, other bonding techniques, and any combinations thereof. It may be preferable that the junctions between the side panels 208 be reinforced to provide additional structure and rigidity to the flange body 202.

In some embodiments, as shown in FIG. 5, the flange body 202 may include reinforcement ribs 210 that generally extend from its input port 204 to its output port 206. In some embodiments, the input port 204 and/or the output port 206 may each include a reinforcement ring 212 about its perimeter.

In other embodiments, the flange body 202 may be formed as a single piece (e.g., blow molded, injection molded), and the reinforcement ribs 110 and/or rings 112 may be included within the molding process and/or added thereafter. In other embodiments, the reinforcement ribs 110 and/or rings 112 may be omitted.

It is understood that the flange body 202 may be formed using any suitable techniques and that the scope of the flange body 202 is not limited in any way by the way in which it is formed.

In some embodiments, the flange body 202 comprises plastic(s) such as, without limitation, high density polyethylene (HDPE), low density polyethylene (LDPE), linear low density polyethylene (LLDPE), acrylic, nylon, polycarbonate, silicone, flexible resin, custom elastomers, other types of plastics, other types of suitable materials, and any combinations thereof.

While the flange body 202 has been described as being shaped generally as a hemispherical dome and/or as a cone with its output port 206 being generally circular, it is understood that the flange body 202 and its output port 206 may include any suitable shapes. In any event, it is preferable that the shape and footprint of the output port 206 generally correspond to the shape and footprint of the dome body opening 106 so that the output port 206 and the dome body opening 106 may be adequately mated during use.

In Use

Figure 7:
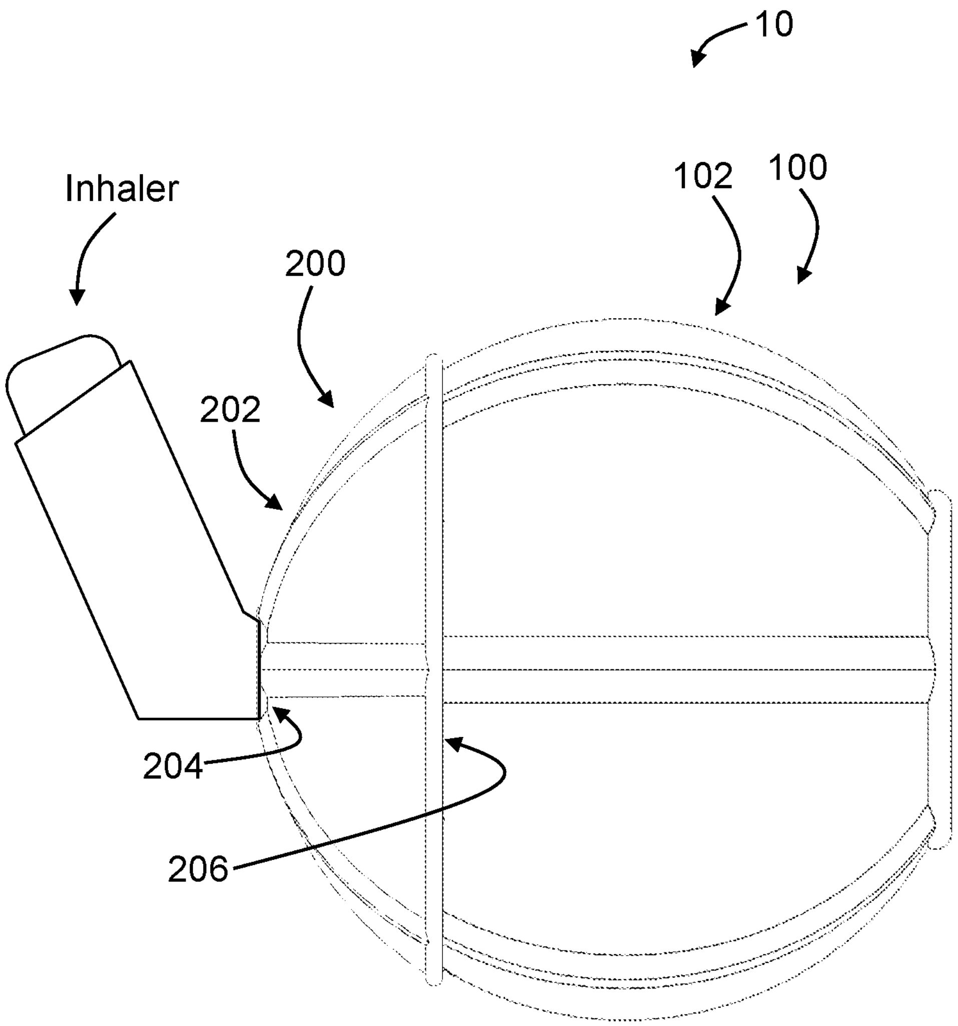
FIG. 7 shows aspects of a dome inhaler system according to exemplary embodiments hereof.

When using the system 10 with a metered-dose inhaler, a user of the system 10 may first insert the output end of the inhaler into the input port 204 of the flange body 202 (see FIG. 6). The user may then press the flange output port 206 against the dome body 102 in the area of the dome body opening 106 so that the output port 206 generally encompasses the opening 106. The result of this configuration is shown in FIG. 7.

Next, the inhaler may be triggered to release a dose of aerosolized medicine. Once released, the aerosolized medicine may pass through the flange's input port 204, through the flange body 202, out the flange's output port 206, through the opening 106 of the dome body 102 and into the dome body's 102's inner volume 104 (the inner volume 104 is shown in FIG. 2). In this way, the dome's inner volume 104 may be filled with a dose of aerosolized medicine.

Figure 8:
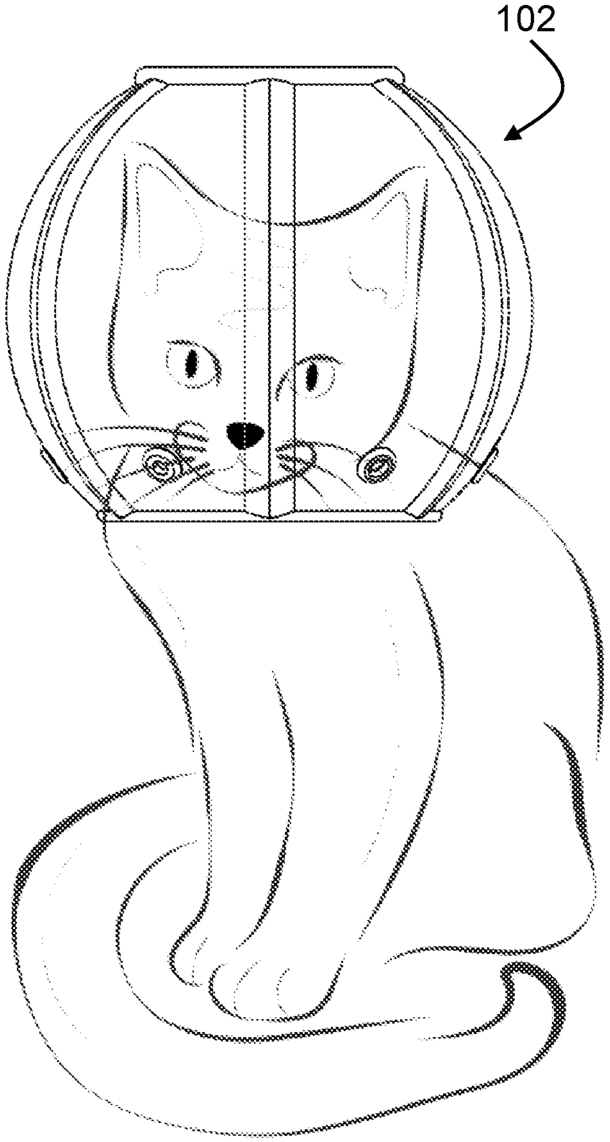
FIG. 8 shows aspects of a dome body resting over an animal's head according to exemplary embodiments hereof.

Next, the flange body 202 may be removed from the dome body 102 (thereby exposing the dome body opening 106), and the dome body 102 may then be placed over the head of a pet (by passing the pet's head through the opening 106) for the animal to breathe in the medicine. The result of this is shown in FIG. 8. After a period of time adequate for the animal to receive the medicine (e.g., 5-20 seconds), the dome body 102 may be removed from the pet by lifting the dome body 102 and allowing the pet's head to pass through the dome opening 106.

When using the system 10 during continuous or metered-dose gas applications (e.g., during treatment of kennel cough), the output of a desired gas supply (e.g., the output end of a gas line connected to a gas tank of oxygen) may be configured with the dome body 102 to supply an externally-controlled level of the gas to the dome body's 102's inner volume 104. As stated in other sections, the output of the gas line may be passed through a breathing hole 114 on the dome body 102 and/or may be configured with the dome's 102's receiving nipple 116 (see FIG. 4). The gas supply may then be controlled (manually and/or automatically) to provide the desired level of gas to the dome body 102. In some embodiments, this may be accomplished through positive pressure introduced from the gas source, creating a local atmosphere enriched via laminar flow of the gas in through the chosen breathing hole 114 and/or receiving nipple 116 and subsequently out through the dome opening 106 and/or any unoccupied breathing holes 114. The dome body 102 may be placed over the animal's head either before or after configuration with gas tubing and the external regulation of gas output.

It is understood that any aspect and/or element of any embodiment of the system 10 described herein or otherwise may be combined in any way to form additional embodiments of the system 10 all of which are within the scope of the system 10.

Where a process is described herein, those of ordinary skill in the art will appreciate that the process may operate without any user intervention. In another embodiment, the process includes some human intervention (e.g., a step is performed by or with the assistance of a human).

As used herein, including in the claims, the phrase "at least some" means "one or more," and includes the case of only one. Thus, e.g., the phrase "at least some ABCs" means "one or more ABCs", and includes the case of only one ABC.

As used herein, including in the claims, term "at least one" should be understood as meaning "one or more", and therefore includes both embodiments that include one or multiple components. Furthermore, dependent claims that refer to independent claims that describe features with "at least one" have the same meaning, both when the feature is referred to as "the" and "the at least one".

As used in this description, the term "portion" means some or all. So, for example, "A portion of X" may include some of "X" or all of "X". In the context of a conversation, the term "portion" means some or all of the conversation.

As used herein, including in the claims, the phrase "using" means "using at least," and is not exclusive. Thus, e.g., the phrase "using X" means "using at least X." Unless specifically stated by use of the word "only", the phrase "using X" does not mean "using only X."

As used herein, including in the claims, the phrase "based on" means "based in part on" or "based, at least in part, on," and is not exclusive. Thus, e.g., the phrase "based on factor X" means "based in part on factor X" or "based, at least in part, on factor X." Unless specifically stated by use of the word "only", the phrase "based on X" does not mean "based only on X."

In general, as used herein, including in the claims, unless the word "only" is specifically used in a phrase, it should not be read into that phrase.

As used herein, including in the claims, the phrase "distinct" means "at least partially distinct." Unless specifically stated, distinct does not mean fully distinct. Thus, e.g., the phrase, "X is distinct from Y" means that "X is at least partially distinct from Y," and does not mean that "X is fully distinct from Y." Thus, as used herein, including in the claims, the phrase "X is distinct from Y" means that X differs from Y in at least some way.

It should be appreciated that the words "first," "second," and so on, in the description and claims, are used to distinguish or identify, and not to show a serial or numerical limitation. Similarly, letter labels (e.g., "(A)", "(B)", "(C)", and so on, or "(a)", "(b)", and so on) and/or numbers (e. g., "(i)", "(ii)", and so on) are used to assist in readability and to help distinguish and/or identify, and are not intended to be otherwise limiting or to impose or imply any serial or numerical limitations or orderings. Similarly, words such as "particular," "specific," "certain," and "given," in the description and claims, if used, are to distinguish or identify, and are not intended to be otherwise limiting.

As used herein, including in the claims, the terms "multiple" and "plurality" mean "two or more," and include the case of "two." Thus, e.g., the phrase "multiple ABCs," means "two or more ABCs," and includes "two ABCs." Similarly, e.g., the phrase "multiple PQRs," means "two or more PQRs," and includes "two PQRs."

The present invention also covers the exact terms, features, values and ranges, etc. in case these terms, features, values and ranges etc. are used in conjunction with terms such as about, around, generally, substantially, essentially, at least etc. (i.e., "about 3" or "approximately 3" shall also cover exactly 3 or "substantially constant" shall also cover exactly constant).

As used herein, including in the claims, singular forms of terms are to be construed as also including the plural form and vice versa, unless the context indicates otherwise. Thus, it should be noted that as used herein, the singular forms "a," "an," and "the" include plural references unless the context clearly dictates otherwise.

Throughout the description and claims, the terms "comprise", "including", "having", and "contain" and their variations should be understood as meaning "including but not limited to", and are not intended to exclude other components unless specifically so stated.

It will be appreciated that variations to the embodiments of the invention can be made while still falling within the scope of the invention. Alternative features serving the same, equivalent or similar purpose can replace features disclosed in the specification, unless stated otherwise. Thus, unless stated otherwise, each feature disclosed represents one example of a generic series of equivalent or similar features.

The present invention also covers the exact terms, features, values and ranges, etc. in case these terms, features, values and ranges etc. are used in conjunction with terms such as about, around, generally, substantially, essentially, at least etc. (i.e., "about 3" shall also cover exactly 3 or "substantially constant" shall also cover exactly constant).

Use of exemplary language, such as "for instance", "such as", "for example" ("e.g.,") and the like, is merely intended to better illustrate the invention and does not indicate a limitation on the scope of the invention unless specifically so claimed.

While the invention has been described in connection with what is presently considered to be the most practical and preferred embodiments, it is to be understood that the invention is not to be limited to the disclosed embodiment, but on the contrary, is intended to cover various modifications and equivalent arrangements included within the spirit and scope of the appended claims.

The invention claimed is:

1. An inhaler system for administering medication to an animal, the animal including an animal head with a head diameter, the inhaler system comprising:

a spherical dome including a dome diameter that is greater than the head diameter, a dome inner volume and a dome opening passing from outside the spherical dome to the dome inner volume, the dome opening adapted to receive the animal head through the dome opening and into the dome inner volume, the spherical dome adapted to surround an entirety of the animal head when the animal head is received through the dome opening;

a flange including a flange input port, a flange output port and a flange inner volume extending between the flange input port and the flange output port;

wherein the flange input port is adapted to receive an output end of an inhaler device;

and wherein the flange output port is adapted to releasably fluidly mate with the dome opening such that the dome opening is configured both (i) to receive the medication into the dome inner volume from the flange when the flange output port is mated with the dome opening and (ii) to receive the animal head through the dome opening and into the dome inner volume when the flange output port is disengaged from the dome opening.

2. The inhaler system of claim 1 further comprising:

at least one breathing hole located in the spherical dome and adapted to allow air to pass from outside the dome inner volume to inside the dome inner volume.

3. The inhaler system of claim 1 wherein when the flange input port receives the output end of the inhaler device and the flange output port releasably mates with the dome opening, the output end of the inhaler device is in fluid communication with the dome inner volume.

4. The inhaler system of claim 1 wherein the spherical dome is transparent or opaque.

5. The inhaler system of claim 1 wherein a portion of the spherical dome surrounding the dome opening includes an outer surface curvature, and the flange output port includes an inner surface curvature that corresponds to the outer surface curvature.

6. The inhaler system of claim 1 wherein a shape of the flange output port corresponds to a shape of the dome opening.

7. The inhaler system of claim 1 wherein a diameter of the flange output port is greater than a diameter of the dome opening.

8. The inhaler system of claim 1 wherein the dome diameter is 5"-8".

9. The inhaler system of claim 1 further comprising a gas tube receiving nipple configured with the spherical dome.

10. An inhaler system for surrounding an entirety of an animal's head and for administering medication thereby, the inhaler system comprising:

a dome including a dome inner volume and a dome opening passing from outside the dome to the dome inner volume;

a flange including a flange input port, a flange output port and a flange inner volume extending between the flange input port and the flange output port wherein the flange input port is located at an apex of the flange output port;

wherein the flange input port is adapted to receive an output end of an inhaler device;

and wherein the flange output port is adapted to releasably fluidly mate with the dome opening.

11. The inhaler system of claim 10 wherein a flange output port cavity is formed as a portion of a hemispherical dome.

12. The inhaler system of claim 10 wherein the dome is spherical.

13. The inhaler system of claim 10 further comprising:

at least one breathing hole located in the dome and adapted to allow air to pass from outside the dome inner volume to inside the dome inner volume.

14. The inhaler system of claim 10 wherein a portion of the dome surrounding the dome opening includes an outer surface curvature, and the flange output port includes an inner surface curvature that corresponds to the outer surface curvature.

15. An inhaler system for surrounding an entirety of an animal's head and for administering medication thereby, the inhaler system comprising:

a dome including a dome inner volume and a dome opening passing from outside the dome to the dome inner volume, wherein a diameter of the dome opening is 3"-6";

a flange including a flange input port, a flange output port and a flange inner volume extending between the flange input port and the flange output port;

wherein the flange input port is adapted to receive an output end of an inhaler device;

and wherein the flange output port is adapted to releasably fluidly mate with the dome opening.

* * * * *